Feb. 5, 1935.  J. A. CREW  1,989,789
PROCESS FOR REMOVING FERROUS IMPURITIES FROM SANDS
Filed Feb. 19, 1934
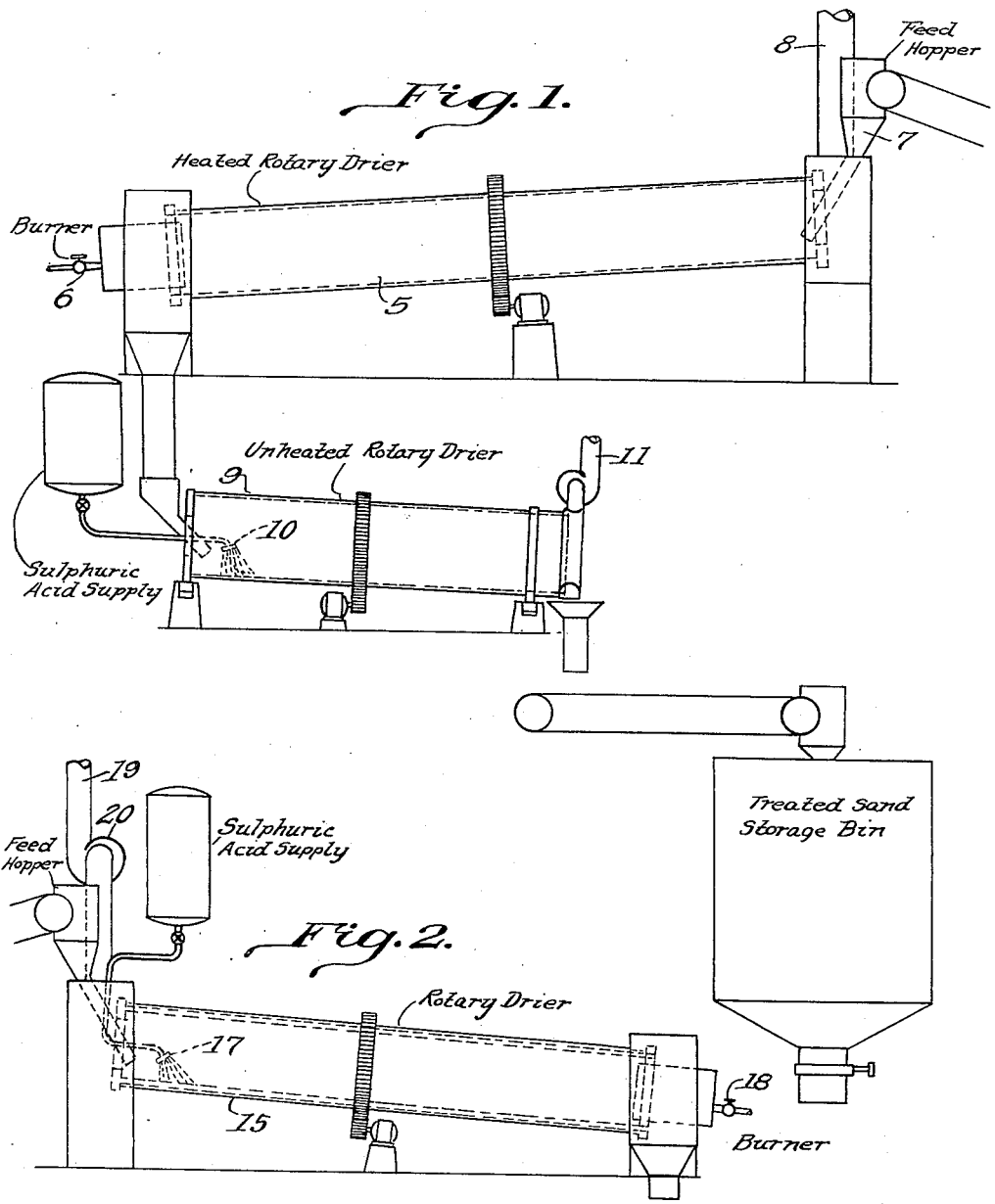

Patented Feb. 5, 1935

1,989,789

UNITED STATES PATENT OFFICE 1,989,789

PROCESS FOR REMOVING FERROUS IMPURITIES FROM SANDS

Joshua A. Crew, Zanesville, Ohio

Application February 19, 1934, Serial No. 711,978

7 Claims. (Cl. 252—8)

This invention relates to an improved process for effecting the removal of ferrous impurities from sands, clays, ores and other granular materials which are adapted for use in the manufacture of glassware, pottery or in other capacities wherein treated materials, free from naturally occurring impurities, are required. Such material, particularly sand, should be substantially free, especially from iron-containing compounds which are present in varying amounts in certain sand deposits.

Such ferrous impurities cling tenaciously to sand particles and are often deeply lodged in the indentations and surface irregularities of the sand grains, and it is a general object of the present invention to provide an improved process for dissolving such impurities and effecting their removal by intimately contacting the sand grains with an acid reagent in the form of commercial sulphuric acid under improved conditions of contact so that the ferrous impurities may be dissolved in or by the reagent and subsequently effectively separated from the sand particles.

Such impurities often take the form of hydrated oxides of iron, some of which are in all probability decomposition products from primary iron sulphides, but most of these oxides are deposits from circulating iron-bearing ground waters. Such impurities are relatively insoluble or difficultly soluble in concentrated sulphuric acid and, therefore, in order to make use of commercial sulphuric acid in its ordinary form, and without primary dilution prior to contact with the sands to be treated, I regulate the moisture content of the sand to be treated so that when the latter is brought into contact with the acid reagent at a temperature of approximately 200° F., the reagent will be diluted automatically to a point where it exerts its maximum leaching effect on the sands undergoing treatment in the matter of dissolving the objectionable ferrous impurities.

Practically all sands, due to methods of mining or recovering the same, contain a relatively high moisture content which of course is subject to considerable variation. Before subjecting such sands to artificially produced heat treatment, I find it economical to weather the sand until it contains a moisture content of approximately 5%. In a preferred form of my invention, sand containing 5% of moisture or thereabouts, depending upon fuel costs and other operating economies, is fed into a rotary drier 5, disclosed diagrammatically in Fig. 1 of the accompanying drawing. This drier is of the usual inclined type and is provided at its discharge end with burners 6 and at its upper or forward end with a sand feeding hopper 7. A vapor outlet 8 is connected with the upper or inlet end of the drier to facilitate the withdrawal of released water vapors or acid fumes if any should be present. During the passage of the sand through the drier 5, the sand is heated to a temperature of the order of 200° F. to 250° F. which effects a reduction in the moisture content of the sand but without thoroughly drying the same, as set forth in my prior application, Serial No. 695,500. For instance, the sand upon discharge from the drier 5 will ordinarily contain about 2% of extraneous moisture.

Immediately upon its discharge from the drier 5, the sand with its reduced moisture content is delivered into the upper end of a second unheated rotary drier 9 at the same time ordinary commercial sulphuric acid (60° or 66° Bé.) is added, the acid being introduced into the drier 9 by spray nozzles 10 or otherwise. Due to the fact that the sand when introduced into the drier 9 contains roughly about 2% by weight of moisture, the acid reagent may be added in such quantities as to produce a dilute film of approximately 40% acid over the sand grains. In this manner there is sufficient water present in the sands contacted with the acid reagent to enable the latter to react effectively with the ferrous impurities contained in or on the sand, it having been previously pointed out that concentrated or full strength sulphuric acid only reacts with difficulty with iron or iron containing compounds to dissolve or attack the same. However, by regulating the amount of self contained moisture in the sand discharged from the heated drier, the desired dilution of the reagent takes place in a manner characterized by a prompt and substantially complete dissolution of the ferrous compounds. Since the sand is in a heated state when brought into contact with said reagent, it is also an added factor in accelerating the rate of reaction. Vapors containing the acid reagent may be withdrawn from the upper or lower end of the unheated drum 9 by way of the duct 11, thus protecting the workers around the apparatus from sulphuric acid fumes. The treated sand discharged from the drum 9 has been found to contain approximately 1% by weight of moisture which provides sufficient moisture to maintain the proper dilution of the acid reagent on the sand grains to expedite the dissolution of the iron impurities.

The treated sand discharged from the drum 9 may be delivered to a storage bin made preferably from wood treated with a coating of asphalt or bitumen. In this bin, the sand is retained for a sufficient period of time to complete the reactions, after which it may then be subjected to the customary washing step wherein the acid reagent and the dissolved impurities may be removed from the sand, leaving the latter in a fine white bleached state suitable for use in the manufacture of high grade glass ware. The drier 5 may have a cylindrical shell internally lined with a heat resisting refractory and does not need an acid-resisting lining. Since the drum 9 is unheated, it may, if desired, be provided with an acid resisting lining but not a high temperature refractory lining.

A modified form of the invention has been disclosed diagrammatically in Fig. 2 wherein but a single drum or rotatable drier, as indicated at 15, is employed. In this form of my invention, the untreated sand containing, for instance, approximately 5% by weight of moisture, is introduced into the upper end of the drum by way of the hopper 16 and acid is added in regulated quantities through the nozzle 17. Burners or other heat generating devices 18 are associated with the lower or discharge end of the drum 15. In this form of my invention, the drum 15 is internally protected by a combined refractory and acid resisting lining. A vapor outlet 19 is connected with the inlet end of the drum 15 with which a suction fan 20 may be associated to positively remove vapors from the drum 15. This apparatus is operated so that the sand when discharged from the drum 15 will contain approximately 1% by weight of moisture.

In view of the foregoing, it will be seen that the present invention provides a sand leaching process capable of producing sand of improved quality, i. e., freedom from iron containing compounds, at low treating costs by bringing commercial sulphuric acid into contact with the iron-containing sands when the latter contain regulated quantities of moisture and under careful temperature regulation. I do not limit myself, however, to the exact amount of moisture specified in the sands undergoing treatment, since this moisture content may vary. However, when the sands are artificially heated, it is desirable from a standpoint of fuel consumption that said sands should not possess a moisture content materially in excess of 5%. However, in regions where fuel costs are not of material consideration, the moisture content of the untreated sands may be considerably higher. The amount of acid to be added to the sand will vary of course in accordance with the relative purity of the sands undergoing treatment. In certain of the sands which I have treated, I add 10 parts of commercial sulphuric acid to 2000 parts of sand, although as explained, this is subject to considerable variation in practice. One of the prime considerations in treating processes of this kind is to maintain treating costs at a minimum, since the treated sands are quite often sold in direct competition with sands which are naturally pure and do not contain the objectionable ferrous impurities above specified. The invention is particularly applicable to such low cost sand treating operations to provide for limited but effective use of the acid reagent employed, second, continuous rapidly operating commercial process, and, third, the employment of simple and economical apparatus with which to carry out the process. By controlling the moisture content of the sand within the limits specified, fuel heating costs are maintained at a minimum and in addition the contained moisture dilutes the sulphuric acid sufficiently to provide for its prompt and efficacious attack on the iron compounds, as well as minimizing the amount of sulphuric acid needed to treat each ton of sand.

While I have particularly described my invention as being applicable to the treatment of silica sand, yet it is of much broader application in the treatment of many different types of raw materials such as various clays or ores or other materials having a granular form. Likewise, in lieu of employing concentrated commercial strength sulphuric acids, it is practicable in many instances to dilute the same so that the acid will possess a strength varying from 40% downward. In addition to sulphuric acid, I may employ hydrochloric or muriatic acid. Nitric acid is considered impractical because of its excessive cost while most of the other common acids are too weak to be effective.

What is claimed is:

1. The method of acid leaching granular materials, comprising the steps of heating moisture containing granular material to a temperature of approximately 200° F. while the material is undergoing agitation to remove excess moisture therefrom, continuing said heating operation until the material contains approximately 1% by weight of moisture, then adding to the material while the same is in a heated state sulphuric acid to coat the material grains with said acid, the moisture contained in said material following heating thereof being sufficient to effect a substantial dilution of the sulphuric acid, and agitating the heated material to bring the sulphuric acid into intimate contact therewith.

2. In a method of removing impurities in the form of iron containing compounds from granular materials such as clays, ores or silica sands, the step which comprises intimately contacting commercial sulphuric acid with such material when the latter possesses a moisture content about 2% by weight and a temperature of approximately 200° F.

3. The method of removing undesired ferrous compounds from silica sand, which comprises the steps of heating such sands to reduce the moisture content thereof to approximately 1%, and during such heating introducing into intimate contact with the sands commercial strength sulphuric acid.

4. The method of removing undesired ferrous compounds from granular materials, comprising continuously subjecting moisture containing material to the action of heat for a sufficient period of time to reduce the moisture content thereof to approximately 1% by weight, and introducing into intimate contact with said material while the latter is undergoing partial dehydration an acid reagent.

5. The method of removing undesired ferrous compounds from silica sand, which comprises the steps of continuously passing a moisture containing untreated sand through a drying zone wherein the sand is heated to a temperature sufficiently high to deprive the same of the greater proportion of its moisture but without reducing its moisture content to an extent appreciably below 1% by weight, then bringing the sand while in a heated turbulent state into intimate contact with regulated quantities of commercial sulphuric acid whereby to coat the sand particles with said acid and to allow the acid to react with the ferrous impurities contained in the sand to effect dissolution thereof, allowing the sand to remain in contact with the acid reagent for a desired reaction period, and separating the acid reagent and the impurities dissolved therein from the sand.

6. The method of removing undesired ferrous compounds from granular raw materials such as silica sand, which comprises the steps of continuously passing moisture containing sand through a drying zone wherein the sand is heated to a temperature sufficiently high to substantially deprive the same of moisture in excess of approximately 2% by weight, and bringing the sand while in a turbulent state without the addition of extraneous heat into intimate contact with an acid reagent capable of dissolving the ferrous impurities contained on the sand.

7. The process of purifying granular materials such as sand, comprising heating a moisture containing sand to evaporate excess water to reduce the sand to a state where it contains substantially not less than 1% and not more than 2% by weight of water, and during such partial dehydration of the sand, introducing into intimate contact therewith a concentrated acid.

JOSHUA A. CREW.